P. L. T. HÉROULT.
GLASS FURNACE AND PROCESS.
APPLICATION FILED AUG. 26, 1910.
1,069,255.
Patented Aug. 5, 1913.
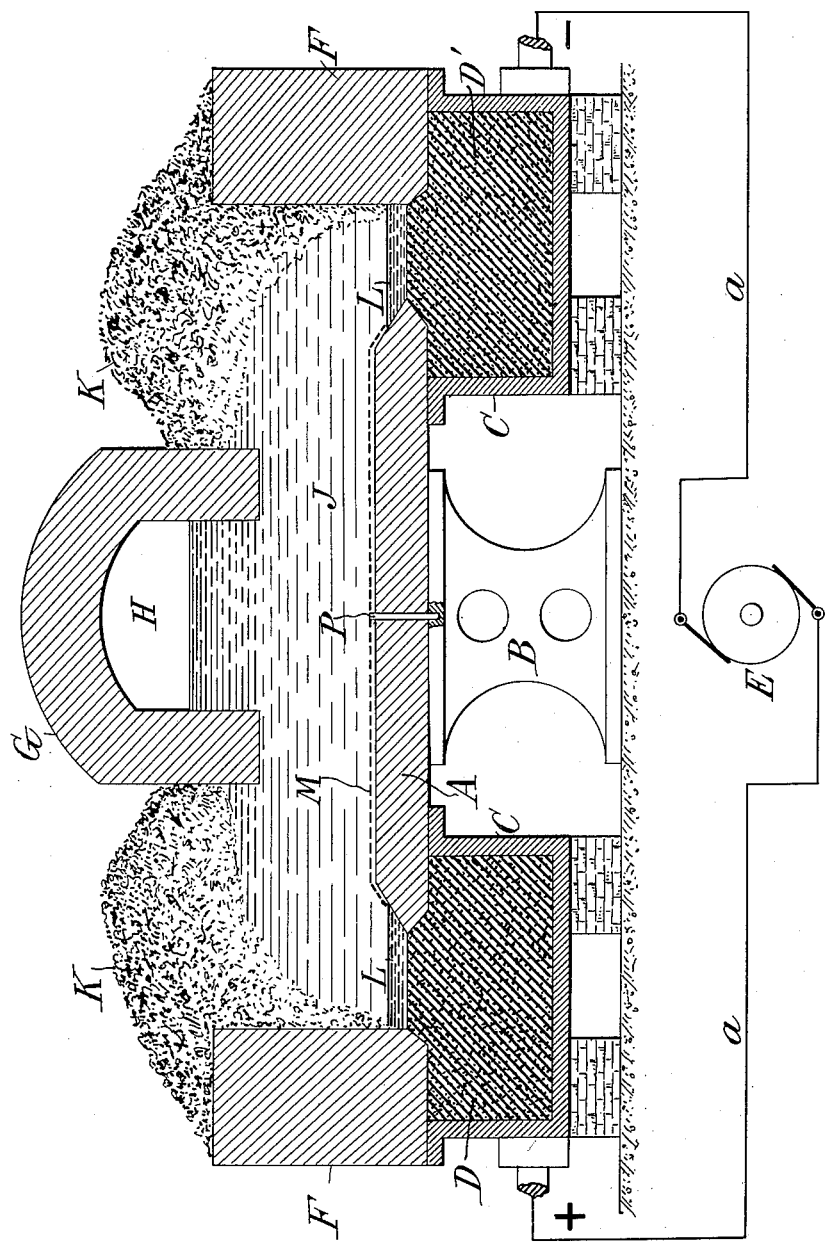
WITNESSES:
René Bruine
Fred White
INVENTOR:
Paul L. J. Héroult,
By Attorneys,
Fraser, Burk & Myers

UNITED STATES PATENT OFFICE.

PAUL L. T. HÉROULT, OF LA PRAZ, FRANCE.

GLASS FURNACE AND PROCESS.

1,069,255.  Specification of Letters Patent.  Patented Aug. 5, 1913.

Application filed August 26, 1910. Serial No. 579,138.

*To all whom it may concern:*

Be it known that I, PAUL LOUIS TOUSSAINT HÉROULT, a citizen of the Republic of France, residing at La Praz, Savoie, France, have invented certain new and useful Improvements in Glass Furnaces and Processes, of which the following is a specification.

In the manufacture of glass, difficulty is experienced in the use of the ordinary reverberatory furnace in keeping the molten glass sufficiently fluid. Glass being a pyroconductor, or body which is electro-conductive when heated to fusion, but a non-conductor when solid and cold, it would appear feasible and desirable to utilize the electric furnace by passing a current through the bath of molten glass, which with a sufficient current would thus be kept molten, since any fall in temperature would occasion such an increased resistance as to reheat the mass to fluidity. A difficulty will be encountered, however, in that the glass is an electrolyte, and the effect, even of an alternating current, would be to alter its composition by the reduction of the metallic oxids which are essential ingredients of the glass, this reduction taking place at and near the carbon terminals of the furnace.

The present invention provides an electric furnace which overcomes this objection and enables the electric heating of molten glass to be practically accomplished. The bath of molten glass is made the resistant and heat-generating conductor; massive carbon terminals are applied to lead the current to and from opposite portions of the bath; and to prevent any reduction due to contact of the glass with the carbon, intervening electrodes of molten metal are provided, a metal being chosen for this purpose which is electro-negative to the metals in the glass. Copper is a suitable and desirable metal for this purpose.

The accompanying drawing shows in transverse section a suitable construction of glass furnace embodying this invention.

Referring to the drawing, let A designate a suitable hearth, which may be of brick or fire-brick, and B a suitable support therefor; C C are cast iron or other suitable casings for the carbon terminals, D D', the latter being made of carbon or graphite which is molded or packed into these casings. Connection may be made with a dynamo or other electric generator E by suitable circuit conductors $a$ $a$ connecting to the casings C C.

F designates the outer wall of the furnace, which may be of ordinary masonry, and which may rest at its opposite sides directly upon the casings C C and carbon terminals D D'. The hearth A also preferably projects over these casings and over the carbon terminals, as shown.

G is a usual form of arch constituting within it a ladling chamber H out of which the hot glass may be ladled through a suitable door in front. The opposite abutments of the arch project down as submerged partitions into the bath of fluid glass. This bath is designated at J, and the mixture of glass-forming material as it is fed to the furnace is shown at K K, this mixture not yet having become molten.

L L are electrodes of copper or other metal which is electro-negative to the metals in the glass, and which must of course be of greater specific gravity than the glass itself so as to underlie it and separate it from the carbon terminals D D'.

The current used may be either direct or alternating, the latter being preferable. The current must of course be of sufficient volume so that in opposing the resistance of the mass of fluid glass J, it will generate sufficient heat to keep this bath of glass molten. It is to be observed that the metal terminals or electrodes L L are widely separated so as to interpose between them a considerable length of the resistant conductor constituted by the molten glass, so as to enable a current of practicable electro-motive force to be used.

In operation, sufficient copper is placed upon the carbons D D' to form when molten the pools L L. A starting path for the current is provided by placing graphite over the brick hearth A, which may be done either by suitably connecting one or more graphite pencils, or by providing an elongated pile of powdered or granulated graphite. This starting path is indicated by the dotted line M. Or a copper rod might be applied at the outset, which would fuse and join the pools L L. A sufficient quantity of glass or of the glass mixture K is then provided to form a molten pool of glass, being so applied as not to disturb the graphite starting path. The current is then started and meeting the resistance of the graphite M, it heats this to incandescence and fuses the surrounding glass, forming a pool, which then conducts its proportion of the current, and which may be added to from time to time until a sufficient mass has been fused and is kept heated to the desired fluidity. The small quantity of graphite used for starting soon disappears, and the glass alone conducts the current.

The ladling chamber H is located approximately midway between the electrodes L L, and hence should present an intermediate potential so nearly neutral that there would be little liability of the workman receiving a shock while ladling out the glass. But to fully guard against such shock, it is preferable to ground the middle portion of the furnace, which may readily be done by introducing a metal rod P, preferably of iron or steel, into the brick hearth A, so that it projects into electric contact with the bath J, and forms a conductor connecting it electrically with the cast iron base B or otherwise with the ground. The workman may stand on an insulating platform, or on an iron platform which is also grounded or connected electrically with the rod P, so as to present the same potential as the middle of the bath, and hence the same as that of the glass in the chamber H.

In place of copper for the electrodes L L, nickel, iron, or other suitable metal may be used.

It is important that the carbon conductors D D' be of large section, and therefore of ample conductivity, so that practically no heat is generated in these conductors. These carbon conductors are of low heat conductivity.

By my furnace it is practicable, by suitably proportioning the parts, to interpose the greatest resistance in the bath of glass beneath the arch G, so that the glass in the ladling chamber H will be the most highly heated and hence of the maximum fluidity.

What I claim is:—

1. Treating liquid glass in an electric furnace with a current between electrodes consisting of metal electro-negative to the metals of the glass.

2. Treating liquid glass in an electric furnace with a current between electrodes consisting of pools of molten metal electronegative to the metals of the glass.

3. An electric furnace for treating glass adapted to contain a bath of molten glass, and having opposite terminals of metal electro-negative to the metals of the glass.

4. An electric furnace for treating glass adapted to contain a bath of molten glass, and having opposite terminals of molten metal electro-negative to the metals of the glass.

5. In an electric furnace, a non-conducting hearth and inclosing walls for holding a bath of molten glass, with carbon terminals on opposite sides of said hearth, and a molten metal electrode overlying each of said carbons.

6. A glass furnace adapted to hold a bath of molten glass, and having opposite electrodes, and an intervening ladling space, with a ground connection to the molten glass adjacent to said ladling space, to protect the workman from shocks.

In witness whereof, I have hereunto signed my name in the presence of two subscribing witnesses.

PAUL L. T. HÉROULT.

Witnesses:
 ARTHUR C. FRASER,
 FRED WHITE.